United States Patent

[11] 3,615,175

[72] Inventor Hugh Wharton Nelson
 West Hartford, Conn.
[21] Appl. No. 809,988
[22] Filed Mar. 24, 1969
[45] Patented Oct. 26, 1971
[73] Assignee Combustion Engineering, Inc.
 Windsor, Conn.

[54] PREVENTING PHYSICAL EXPLOSION DUE TO THE INTERACTION OF LIQUID WATER AND MOLTEN CHEMICAL COMPOUNDS
 3 Claims, No Drawings

[52] U.S. Cl. .................................................. 23/48,
 23/1 R, 23/61, 162/30
[51] Int. Cl. ................................................ C01d 11/00,
 D01n 33/00, D21c 11/12
[50] Field of Search ........................................ 23/48, 1 R,
 64, 61, 230 A; 162/30

[56] References Cited
 UNITED STATES PATENTS
 1,982,688 12/1934 Pack ............................ 23/64
 3,447,895 6/1969 Nelson et al. ................. 23/48

Primary Examiner—Oscar R. Vertiz
Assistant Examiner—Hoke S. Miller
Attorneys—Carlton F. Bryant, Eldon H. Luther, Robert L. Olson, John F. Carney, Richard H. Berneike, Edward L. Kochey, Jr. and Lawrence P. Kessler ABSTRACT: A method for preventing physical explosions, particularly of the smelt-water reaction type, in kraft chemical recovery furnaces. Upon detection of the presence of liquid water in the furnace, a solid compound capable of highly endothermic chemical reaction upon thermal decomposition is introduced into the furnace to cover the molten smelt on the furnace bottom. The decomposition reaction serves to inert the furnace with the nonflammable gases produced thus eliminating further heat production due to combustion in the char bed while solidifying the molten smelt (i.e., removing sensible heat stored therein) which is the source of explosive energy. The materials which may be employed for this purpose are alkali and alkaline earth carbonates and bicarbonates including sodium bicarbonate, ammonium carbonate and ammonium bicarbonate.

PREVENTING PHYSICAL EXPLOSION DUE TO THE INTERACTION OF LIQUID WATER AND MOLTEN CHEMICAL COMPOUNDS

BACKGROUND OF THE INVENTION

Due to the many serious explosions which have occurred in kraft chemical recovery furnaces, studies have been conducted in order to analyze the mechanics of these explosions with a view toward developing methods by which they can be prevented. These studies indicated that violent noncombustible physical explosions result when a quantity of water or water solution of chemicals becomes submerged beneath the surface of the molten kraft smelt which collects on and drains from the furnace floor. The water may become available for such explosive interaction with the molten smelt under conditions such as might result from a tube leak.

Although the present invention is not to be limited by any particular theory for the cause of the physical explosions of the smelt-water reaction type, one possible explanation for this type of explosion is suggested in application Ser. No. 598,228, filed Dec. 1, 1966, by Hugh Wharton Nelson and Charles L. Norton, now U.S. Pat. No. 3,447,895. This theory concerns a small quantity of liquid water submerged within the molten smelt which becomes rapidly encapsulated in a frozen smelt shell. Due to the heat transfer, water pressure within the frozen shell develops tremendously in a matter of a few milliseconds to the point where it causes the shell to violently rupture. The resultant agitation due to the rupture causes additional bulk (unencapsulated) liquid water to come into intimate contact with the molten smelt. The extremely rapid heat transfer caused by finely divided molten smelt particles traveling at high velocity through bulk liquid water results in the water being converted to steam with a consequent 1700-fold multiplication of volume upon phase change.

This sudden creation of gas (steam) constitutes a physical explosion phenomenon which occurs only with liquid (molten) chemical compounds, such as kraft smelt, and liquid water (or water solutions). Physical type explosions contrast with the combustible type of explosion which produces rapidly expanding gases by a highly exothermic chemical reaction. Since these explosion causing mechanisms are different, prevention methods would necessarily be different also. For example, while merely inerting a furnace atmosphere with gases such as water vapor and/or carbon dioxide would prevent a combustible explosion, such a technique would not counteract a physical explosion which can occur under water or in a 100 percent nitrogen atmosphere.

DESCRIPTION OF THE INVENTION

A peculiar phenomenon of physical explosions of the molten smelt-liquid water reaction type is that such explosions only occurred, if they occurred at all, after a considerable amount of time has elapsed from the initiation of a water injection into the molten smelt. This delay may be due to adjustment of smelt temperature (kraft smelt only reacted explosively when the temperature thereof was between its approximate freezing temperature of 1,425° F. and about 1,725° F.) dissolved smelt content of the water, or mixing geometry, all of which strongly influence physical explosions. It is the purpose of this invention to provide a method whereby during this substantial time-delay period after water is detected the molten furnace smelt may be rapidly cooled to below the approximate 1,425° F. to freeze the bed so that an explosion cannot occur.

The novel method of this invention requires that, upon water detection a solid compound capable of highly endothermic chemical reaction upon thermal decomposition is introduced to blanket the entire area covered by the molten smelt. In a kraft chemical recovery furnace, for example, the decomposition reaction provides a copious supply of nonflammable gases which serve to inert the furnace thus eliminating further heat production due to combustion in the char bed while concurrently solidifying the molten smelt (which is the source of explosive energy) by heat removal to suppress any explosion. The materials which may be employed for this purpose are alkali and alkaline earth carbonates and bicarbonates including, in particular, sodium bicarbonate, ammonium carbonate, and ammonium bicarbonate.

Sodium bicarbonate is an ideal material to use in preventing physical explosions of the smelt-water reaction type in that it is a dry solid which in and of itself cannot cause an explosion with molten smelt under any conceivable circumstances. It is a cheap, readily available chemical which is nontoxic to humans and the thermal decomposition products are likewise nontoxic. It does not absorb water from the atmosphere and hence would not be expected to cake upon storage. Since it is stable at well above room temperature, it could be safely stored adjacent the furnace without any adverse effects.

Sodium bicarbonate decomposes readily upon heating to about 500° F. by the following highly endothermic reaction:

The carbon dioxide and water vapor from this reaction make up 37 percent of the weight of the original sodium bicarbonate. Both of these gases are inert and would tend to smother combustion on the char bed. Sodium carbonate, the solid product of the thermal decomposition, is native to the kraft chemical recovery system since 80 percent of the smelt is normally made up of this material. Therefore a further advantage in using sodium bicarbonate to prevent explosions is derived in that no cleanup or dumping of the furnace contents would be necessary following emergency use of this chemical to prevent an explosion. It is noted that sodium carbonate is soluble in molten smelt and would absorb heat by dissolving in it. The solubility of the sodium carbonate additionally serves to decrease the sulfidity of the molten smelt. Since the explosive smelt-water reaction was found to intensify directly with increasing sulfidity, such reduction would make the smelt less explosive with water within the furnace. Moreover, the addition of sodium carbonate to the smelt raises the melting temperature of the smelt, thus enabling it to freeze at a higher temperature than the approximate melting point, 1,425° F.

Thermal decomposition of sodium bicarbonate into carbon dioxide, water vapor and sodium carbonate is a highly endothermic reaction. It has been calculated that thermal decomposition absorbs 329 BTU's per pound, which in addition to the 133 BTU's required to raise the sodium bicarbonate up to the decomposition point, yields a total of 462 BTU's which each pound of sodium bicarbonate could absorb from the hot char and smelt when, for example, applied to the hearth of a kraft chemical recovery furnace. The sodium bicarbonate is therefore an excellent heat sink in addition to a good agent for inerting the furnace (i.e., terminating combustion on the char bed and eliminating further production of heat).

As an illustrative example, further calculations indicate that 2,210,000 BTU's would have to be removed from the hot char bed in a 600 ton decanting bottom furnace to cool it from 1,800° F. to 750° F., the ignition point. In addition about 4,050,000 BTU's would have to be removed from the 3-inch deep layer of 1,800° F. smelt to cool and solidify it at 1,425° F. Therefore, it may be determined that 99 ft.$^3$ of sodium bicarbonate would provide the necessary heat sink. This quantity corresponds to a layer 2 inches deep all over the projected hearth area of a 24 ft.$^2$ furnace.

If the sodium bicarbonate is used in the form of a fine powder it will sift down through the crevices in the char bed of the kraft chemical recovery furnace. The rate of $CO_2$ evolution will not be as rapid as if, for example, solid $CO_2$ were used for inerting the furnace. The fire-smothering action of the slower evolving $CO_2$ from the sodium bicarbonate might thus be superior to the solid $CO_2$ in that if solid $CO_2$ were used, it would probably cause streams of high velocity gas to be shot from the smelt bed rather than producing a quiescent inert gas blanket which would snuff out the flames.

Carbonates and bicarbonates of other alkali and alkaline earth compounds like ammonium bicarbonate and ammonium carbonate have been considered as alternative solids for preventing the physical smelt-water reaction explosions in kraft chemical recovery furnaces. While having basically the same characteristics as the sodium bicarbonate, these ammonium compounds might not have the thermal stability required for long-term storage which sodium bicarbonate has and therefore offer a lower degree of practical feasibility. When considering factors such as intended use with particular reactive compounds, possible contamination, price, or storage conditions, other carbonates or bicarbonates such as potassium bicarbonate and magnesium carbonate may be used as the suppressant.

The method of this invention will operate as follows. Once a water leak, into the smelt bed of a kraft chemical recovery furnace, for example, is identified, an emergency mechanism would be activated. The emergency mechanism would cut off the liquor and auxiliary fuel feed to the furnace as well as shutting down the ID and FD fans in the system. The solid explosion preventive compound would then be dispersed in depth over the entire bottom of the furnace floor including the ash bed. This solid suppressant would be stored in a hopper external to the furnace and above the hearth level in a relatively cool, dry location. A quick opening and dispersing mechanism would spread the suppressant quickly and evenly over the char bed and smelt on the hearth to prevent the physical smelt-water reaction explosion by inerting the furnace and removing heat from the smelt for solidification thereof in the manner hereinabove explained.

By the foregoing description it is apparent that I have discovered a novel method for preventing physical explosions of the smelt-water type such as might occur upon water leaks in kraft chemical recovery furnaces. Upon detection of the presence of water in the furnace, a solid compound capable of a highly endothermic chemical reaction upon thermal decomposition is introduced into the furnace to cover the smelt bed. The decomposition reaction serves to inert the furnace while solidifying the smelt bed to suppress any physical explosion. As detailed, the materials which may be employed for this purpose are alkali and alkaline earth carbonates and bicarbonates particularly including sodium bicarbonate, ammonium carbonate and ammonium bicarbonate.

While these preferred embodiments of the invention have been described, it will be understood that such descriptions are merely illustrative and that changes may be made without departing from the scope of the invention as claimed.

I claim:

1. A method for preventing physical smelt-water reaction explosions in kraft chemical recovery furnaces in the event of a water leak within the furnace, the steps including detecting said water leak within said furnace and, upon detection, introducing onto the molten kraft smelt a solid physical explosion suppressant material selected from the group consisting of sodium bicarbonate, ammonium carbonate and ammonium bicarbonate.

2. The method of claim 1 wherein said physical explosion suppressant material is in the form of small pellets which are spread evenly over the molten kraft smelt to form a blanket thereover.

3. The method of claim 2 wherein said blanket of physical explosion suppressant pellets is at least 2 inches deep over the entire smelt bed.